Jan. 29, 1924.
R. A. SMITH
1,482,097
FLEXIBLE COUPLING
Filed April 20, 1921
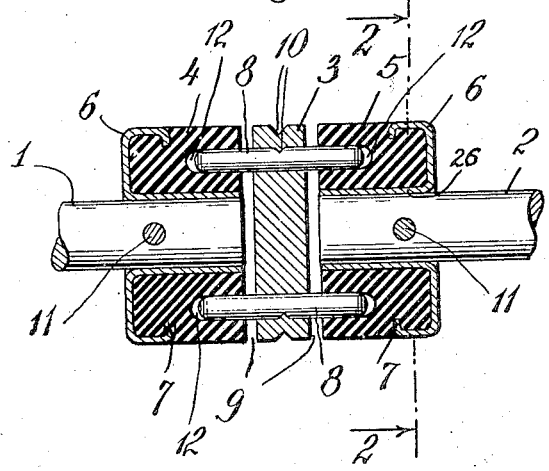
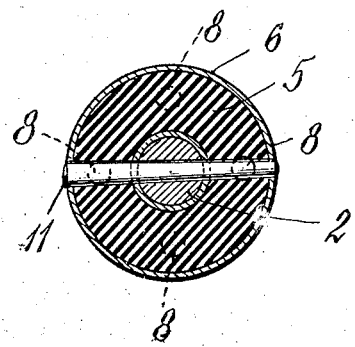
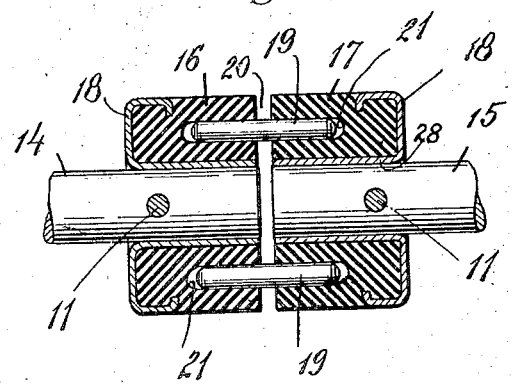
Inventor
Robert A Smith
By his Attorney
Harry L Duncan Patented Jan. 29, 1924.

1,482,097

UNITED STATES PATENT OFFICE.

ROBERT A. SMITH, OF MAHWAH, NEW JERSEY, ASSIGNOR TO SMITH & SERRELL, OF MAHWAH, NEW JERSEY, A COPARTNERSHIP CONSISTING OF HIMSELF AND JOHN J. SERRELL.

FLEXIBLE COUPLING.

Application filed April 20, 1921. Serial No. 462,876.

*To all whom it may concern:*

Be it known that I, ROBERT A. SMITH, a citizen of the United States, and resident of Mahwah, Bergen County, State of New Jersey, have made a certain new and useful Invention Relating to Flexible Couplings, of which the following is a specification, taken in connection with the accompanying drawing, which forms part of the same.

This invention relates especially to flexible couplings for light service, as where small sized electric motors are to be coupled to light machinery, in which there may be slight amounts of axial or annular misalignment between the shaft elements. Suitable yielding coupling members or ends of vulcanized rubber which may have special composition may be secured to the shaft ends in any suitable way and coupling pins arranged between these two coupling ends fit loosely within sockets or holes in the ends, so as to transmit the driving torque and yet allow the necessary misalignment movement. These pins may advantageously in some cases be rigidly secured to an intermediate pin support such as a disc between the coupling ends, and while rigid metallic pins are usually desirable yet in some cases for special service resilient or spiral spring pins may be used in such couplings.

In the accompanying drawing showing in a somewhat diagrammatic way illustrative embodiments of this invention, Fig. 1 is a longitudinal section of one coupling.

Fig. 2 is a transverse section thereof taken substantially along the line 2—2 of Fig. 1; and Fig. 3 is a longitudinal section of another coupling.

The shafts 1, 2 may have the yielding coupling members 4, 5 rigidly secured thereto as by the connector pins 11, passing through these elements and if desired a suitable liner or bushing 26 of brass or other suitable material may be moulded within the valcanized rubber coupling ends or members when they are formed so as to give a more rigid and accurate shaft connection and in some cases if desired this bushing may be carried up on one side of the rubber end in the form of a flange 6, which may have the inturned edge 7 embedded in the rubber if desired. These vulcanized rubber members may be conveniently moulded with a series of recesses 12 arranged annularly around the axes of the members and preferably parallel thereto, four of such recesses being shown as extending about half way through each coupling end.

In the arrangement shown in Fig. 1, the series of rigid coupling pins 5 of such size as to fit properly within the recesses 12, are shown as mounted on a pin support or disc 3 in which they may be rigidly held in any suitable way as by a drive fit therein or by the use of prick-punch depressions 10 or the like. The end members are preferably so mounted on the shafts as to allow a slight longitudinal clearance 9 on either side of this pin support and at the ends of the coupling pins, and the yielding character of the rubber or other resilient material used for the coupling ends facilitates the slight bending or movement of the pins to take care of misalignment and to slightly cushion the driving impacts, and this also considerably contributes to minimizing transmission of noise between the shaft sections.

In Fig. 3 the shaft sections 14, 15 are shown as provided with similar vulcanized rubber or resilient coupling ends 16, 17 which may preferably though not necessarily be provided with the inturned bushing 28 and end flange 18. In this case the coupling ends are brought closer together, so that only a moderate clearance 20 is provided between them and loose coupling pins 19 are arranged within the recesses 21, which gives a still greater freedom of movement between the shaft sections, even when rigid coupling pins are used.

This invention has been described in connection with a number of illustrative embodiments, forms, shapes, proportions, sizes, materials, and arrangements, to the details of which disclosure the invention is not of course to be limited, since what is claimed as new and what is desired to be secured by Letters Patent is set forth in the appended claims.

1. In flexible couplings, vulcanized rubber coupling members adapted to be connected to shafts and formed with axial metallic bushings and end flanges on their outer separated ends, said coupling members being formed with an annular series of sockets substantially parallel to their axes, a series of rigid coupling pins each extending a considerable distance into the sockets of the two cooperating coupling members and a disc shaped pin support in which said coupling pins are rigidly and permanently mounted.

2. In flexible couplings, vulcanized rubber coupling members adapted to be connected to shafts and formed with axial metallic bushings, said coupling members being formed with an annular series of sockets substantially parallel to their axes, a series of rigid coupling pins each extending a considerable distance into the sockets of the two cooperating coupling members and a pin support in which said coupling pins are rigidly mounted.

3. In flexible couplings, yielding rubber coupling members adapted to be connected to shafts and formed with moulded-in metallic stiffening members cooperating with the shafts, said coupling members being formed with an annular series of sockets substantially parallel to their axes and a series of rigid coupling pins each extending a considerable distance into the sockets of the two cooperating coupling members and a pin support in which said coupling pins are rigidly mounted.

4. In flexible couplings a pair of one piece yielding rubber coupling members adapted to be connected with shafts and each formed with a series of sockets substantially parallel to their axes, a series of coupling pins each extending a considerable distance into the sockets of the two cooperating coupling members and a rigid support in which all of said pins are rigidly mounted.

5. In flexible couplings, yielding coupling members adapted to be connected to shafts and each formed with a series of sockets substantially parallel to their axes and a series of rigid coupling pins each slidingly extending a considerable distance into the sockets of the two cooperating coupling members.

6. In flexible couplings a pair of one piece yielding rubber coupling members adapted to be connected with shafts and each formed with a series of sockets, a series of coupling pins each extending a considerable distance into the sockets of the two cooperating coupling members and a support in which said pins are mounted.

7. In flexible couplings, yielding rubber coupling members adapted to be connected to shafts and formed with a series of sockets substantially parallel to their axes and a series of coupling pins each extending a considerable distance into the sockets of the two cooperating coupling members and a pin support in which said coupling pins are mounted.

8. In flexible couplings a pair of one piece yielding rubber coupling members adapted to be connected with shafts and each formed with a series of sockets and a series of coupling pins each extending a considerable distance into the sockets of the two cooperating coupling members.

9. In flexible couplings, rubber coupling members adapted to be connected to shafts and formed with an annular series of sockets substantially parallel to their axes and a series of coupling pins each extending a considerable distance into the sockets of the two cooperating coupling members.

10. In flexible couplings, a yielding rubber coupling member adapted to be connected to a shaft and formed with an internal metallic bushing and with a series of sockets and a cooperating coupling device having driving elements extending a considerable distance into the sockets of said coupling member.

ROBERT A. SMITH.